United States Patent
Canterberry et al.

(10) Patent No.: US 7,007,973 B2
(45) Date of Patent: Mar. 7, 2006

(54) TUBULAR DUAL STAGE INFLATOR

(75) Inventors: JB Canterberry, Apollo Beach, FL (US); Keith Lam, Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 252 days.

(21) Appl. No.: 10/419,904

(22) Filed: Apr. 22, 2003

(65) Prior Publication Data

US 2004/0212184 A1 Oct. 28, 2004

(51) Int. Cl.
*B60R 21/28* (2006.01)

(52) U.S. Cl. ................. 280/741; 102/202.7; 102/202.9; 102/202.14

(58) Field of Classification Search ................. 280/741, 280/736, 740, 742; 102/202, 202.5, 202.7, 102/202.9, 202.14
See application file for complete search history.

(56) References Cited

U.S. PATENT DOCUMENTS

| | | | |
|---|---|---|---|
| 5,799,973 A | | 9/1998 | Bauer et al. ................. 280/741 |
| 5,934,705 A | | 8/1999 | Siddiqui et al. ............. 280/736 |
| 6,095,561 A | * | 8/2000 | Siddiqui et al. ............. 280/742 |
| 6,149,193 A | | 11/2000 | Canterberry et al. ........ 280/741 |
| 6,314,888 B1 | * | 11/2001 | Muller et al. ................ 102/530 |
| 6,601,872 B1 | * | 8/2003 | Zimbrich et al. ............ 280/737 |
| 6,746,044 B1 | * | 6/2004 | Elqadah et al. ............. 280/736 |

FOREIGN PATENT DOCUMENTS

EP 0382552 2/1990

* cited by examiner

*Primary Examiner*—Eric Culbreth
(74) *Attorney, Agent, or Firm*—Jarett Rieger; Lonnie Drayer

(57) ABSTRACT

A tubular inflator has a bulkhead that divides the inflator into a first and second combustion chambers. Each combustion chamber has an igniter assembly, gas generant, and compressed wire filter. The wire filters in the inflator are positioned so that they contact the bulkhead. The filters and the bulkhead prevent sympathetic ignition in the inflator, which is defined as the ignition of gas generant in one combustion chamber from the heat generated from the burning of the gas generant in the other combustion chamber. The igniter assembly has an igniter core that is molded by a unitary plastic material. The plastic overmold has threads for attaching the igniter assembly to the inflator, and the plastic overmold has a retainer portion for retaining an enhancer tablet.

9 Claims, 3 Drawing Sheets ively interacts with the airbag. Vehicle occupants such as children or small adults may be positioned too close to an airbag module, whereby they may interact with a deploying airbag. Furthermore, an out-of-position adult such as an adult leaning forward before a crash occurs may also interact with a deploying airbag.

TUBULAR DUAL STAGE INFLATOR

FIELD OF THE INVENTION

The present invention relates to a gas generator or airbag inflator utilized in a motor vehicle for inflating an inflatable restraint cushion, commonly known as an airbag. More particularly, the airbag inflator in the present invention can provide varying airbag inflation rates.

BACKGROUND OF THE INVENTION

In an airbag system, there is typically a gas source and an inflatable restraint device, which is commonly known in the safety industry as an airbag. In the event of a vehicle crash, the gas source is actuated whereby gas is rapidly channeled into a folded airbag. The inflated airbag provides an energy-absorbing cushion that affords protection to a vehicle occupant during a crash. The airbag serves to minimize occupant injury by absorbing the kinetic energy of the vehicle occupant in a controlled fashion to minimize the deceleration forces experienced by the vehicle occupant. The lower the deceleration forces experienced on the vehicle occupant's chest or head, the lower the likelihood of injury.

In order for the airbag to function properly, the airbag needs to be fully deployed before the vehicle occupant interacts with the airbag. The vehicle occupant begins interacting with the airbag less than 100 milliseconds after the crash occurred, and thus the inflator must provide inflation gas in an extremely rapid manner to fully inflate the airbag before the vehicle occupant contacts thereof. The rapidly inflating airbag may induce injury on the vehicle occupant if the vehicle occupant is interfacing with the deploying airbag. The rapidly inflating airbag has an inflation force associated thereto, which may be applied to the vehicle occupant if the airbag is not fully deployed before the vehicle occupant interacts with the airbag. Vehicle occupants such as children or small adults may be positioned too close to an airbag module, whereby they may interact with a deploying airbag. Furthermore, an out-of-position adult such as an adult leaning forward before a crash occurs may also interact with a deploying airbag.

A dual stage or multiple stage inflator has been proposed to combat the problem of the rapidly inflating airbag potentially injuring a child, small adult, or out-of-position adult. The dual stage inflator has the flexibility of providing a constant gas flow rate into the airbag similar to the single stage inflator, but the dual stage inflator may also provide varying gas flow rates. A dual stage inflator may have pyrotechnic material, stored gas, or some combination thereof. The pyrotechnic dual stage inflator has two ignition systems and two gas generants, whereby a first ignition system is utilized to ignite only the first gas generant and the second ignition system is utilized to ignite only the second gas generant. The dual stage inflator provides a constant gas flow rate by igniting both the first and second gas generants at the same time. Since the dual stage inflator has two ignition systems, the gas generants may be ignited at different times, which varies the gas flow rate. The second gas generant may optionally be ignited while the first gas generant is burning, and the second gas generant may also be ignited after the first gas generant is no longer generating any inflation gas. The dual stage inflator will completely inflate an airbag like the single stage inflator, but has the advantage of having the ability to have a low onset inflation rate. The low onset inflation rate is beneficial in circumstances where a child or small adult will interact with an airbag while the airbag is being deployed. In these circumstances, the likelihood of the inflating airbag injuring the occupant is reduced because the inflation rate is lowered. Preferably, after the occupant interacts with the inflating airbag, the second gas generant is ignited to fill the remainder of the airbag.

Due to the flexibility of the dual stage inflator to tailor the gas output based upon the size and position of the vehicle occupant, there is a need to design cheaper and simpler dual stage inflators.

SUMMARY OF THE INVENTION

The inflator in the present invention has a tubular configuration with the combustion chambers arranged side-by-side. The inflator has a symmetrical design with two combustion chambers. Each combustion chamber has an igniter assembly, gas generant, and a wire filter. A bulkhead separates the inflator into a first and second combustion chambers.

An aspect of the inflator in accordance with the present invention is the feature that the combustion chambers are isolated from one another so that sympathetic ignition does not occur. Both the first and second combustion chambers have gas generant, and the burning of the gas generant in the first combustion chamber will not ignite the burning of the gas generant in the second combustion chamber. The gas generant in a given combustion chamber will only ignite if the igniter assembly in the same combustion chamber is fired.

Another aspect of the inflator is the use of a single plastic material molded around an igniter core. The plastic overmold has threads which are utilized for attaching the igniter assembly to an endcap of the inflator. The plastic overmold also has a retainer portion for securing an enhancer tablet to the igniter assembly. During a car crash, the igniter is fired, which ignites the enhancer, which in turn ignites the gas generant. The burning of the gas generant yields inflation gas, which is channeled into an airbag.

BRIEF DESCRIPTION OF THE DRAWINGS

With this summary of the invention, a detailed description follows with reference being made to the accompanying drawings which form part of the specification in which like parts are designated by the same reference numbers and of which.

DETAILED DESCRIPTION OF THE INVENTION

Figure 1:
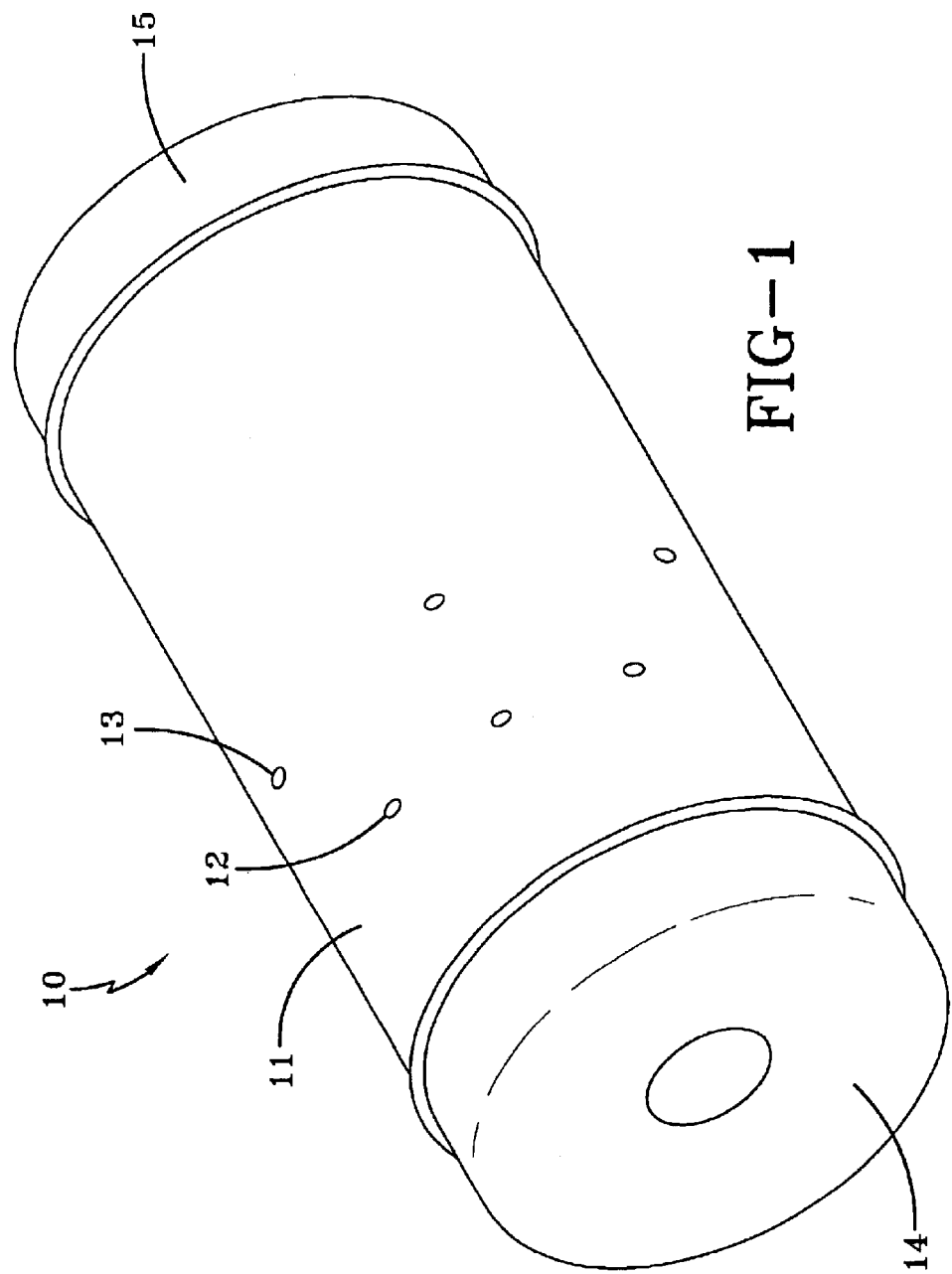
FIG. 1 is a perspective view of the inflator in accordance with the present invention.

The inflator in accordance with the present invention is a tubular inflator with the combustion chambers arranged in a side-by-side configuration. Co-assigned U.S. Pat. No. 6,149,193 teaches a similar designed tubular inflator and is incorporated herein in its entirety. With reference to FIG. 1, an inflator 10 has essentially a tubular shape with a plurality of exit ports around the circumference thereof. The exit ports provide a channel or passageway through the inflator housing 11 for the inflation gas to escape the inflator 10. The inflation gas generated by the inflator 10 is utilized to inflate an airbag (not shown) during a car crash to protect a vehicle occupant from sustaining injuries. As seen in FIG. 1, there are two rows of exit ports, a first row of exit ports 12 receive inflation gas from the first combustion chamber 57 and a second row of exit ports 13 receive inflation gas from the second combustion chamber 58. The first row of exit ports 12 and the second row of exit ports 13 are disposed around the circumference of the inflator housing 11 in an arrangement so that the inflator 10 is thrust neutral while inflation gas is exiting the inflator 10. The number and size of the exit ports may be modified without departing from the scope of the present invention.

FIG. 1 also shows the first and second endcaps 14,15 of the present invention. The first endcap 14 and second endcap 15 are attached on opposite ends of the housing 11. The endcaps 14,15 are secured to the housing 11 via a circumferential weld such as a friction weld, tungsten inert gas (TIG), laser, and the like. The endcaps 14,15 are mounted flush with the housing 11 whereby the diameters of the endcaps are substantially equal to the diameter of the housing 11. The housing 11 and endcaps are made from a metallic material such as aluminum, steel, and the like. The housing 11 and the endcaps 14, 15 are non-gas permeable to prevent moisture from entering the inflator 10 and are able withstand elevated combustion pressures during the burning of the gas generant 51.

Figure 2:
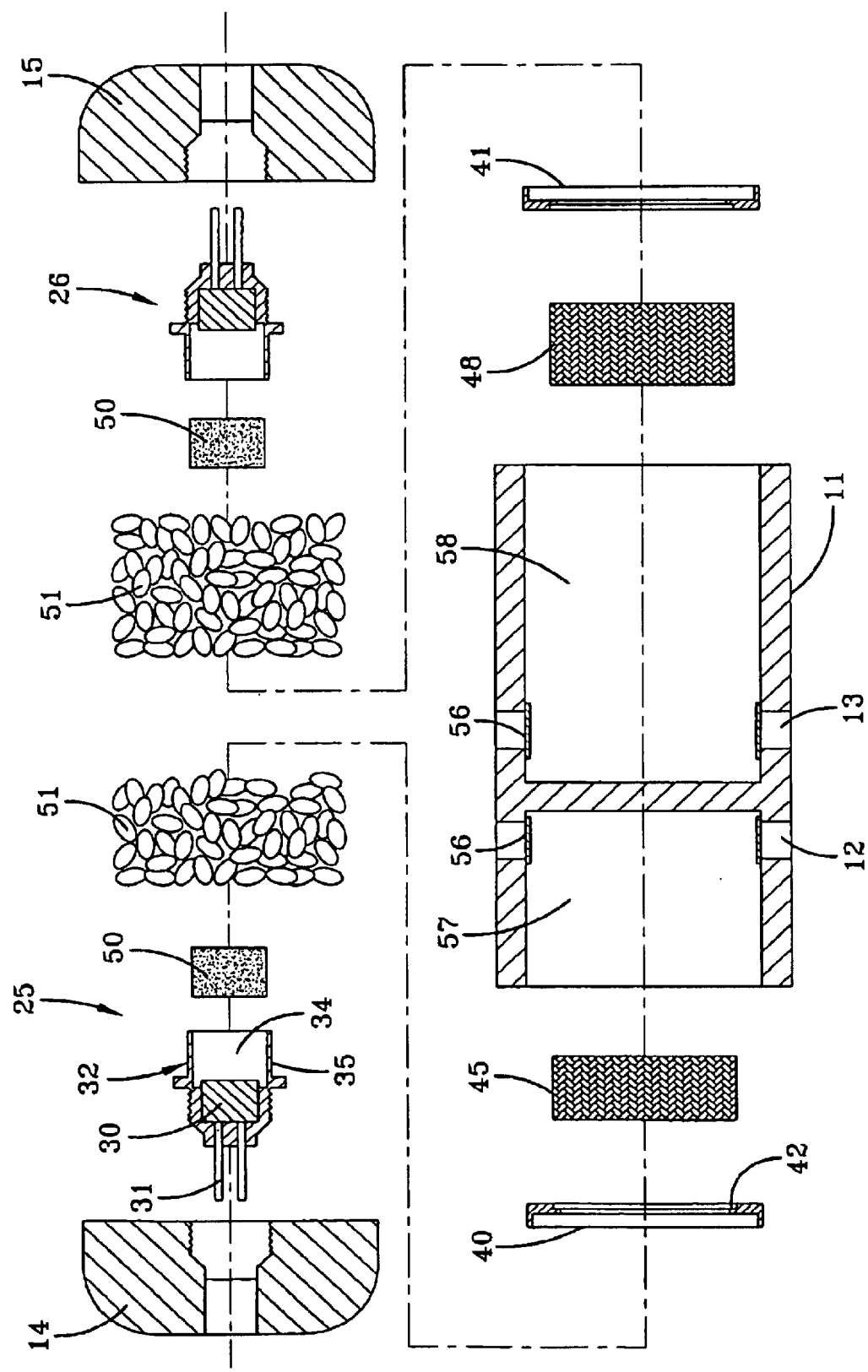
FIG. 2 is an exploded view of the inflator shown in FIG. 1.

FIG. 2 shows an exploded view of the inflator 10 showing the various physical components. The inflator 10 in the present invention is symmetrical with regards to the physical components within the combustion chambers. The combustion chambers represented in FIGS. 2 and 3 do not have the same dimension; the embodiment shown in the FIGS has combustion chambers of unequal volume whereby the first combustion chamber 57 has a smaller volume or size than the second combustion chamber 58. The unequal volume chambers allow the inflator gas output to be more easily tailored to the crash situation. An inflator 10 having equal combustion chambers is within the scope of the present invention.

The housing 11 has a bulkhead 55 that divides the interior volume of the housing 11 into two portions, the first combustion chamber 57 and the second combustion chamber 58. The housing 11 is made from aluminum, low carbon steel, or any other metal/alloy that is not gas permeable and that does not fragment during the burning of the gas generant 51. The preferred method of manufacturing the housing 11 with the bulkhead 55 is by a double punching operation, whereby two punches force metal from both ends of the housing 11. Thus, the bulkhead 55 is made from the same material as the remainder of the housing 11. The bulkhead 55 separates the first combustion chamber 57 from the second combustion chamber 58. The bulkhead 55 along with the filters 45, 48 prevent sympathetic ignition, which is defined herein as the ignition of a gas generant in one combustion chamber by the burning of the gas generant in the other combustion chamber. Sympathetic ignition would occur for example when the gas generant 51 is deliberately ignited in the first combustion chamber 57 by the first igniter, and the heat and energy associated with the burning of the gas generant 51 ignite the gas generant 51 in the second combustion chamber 58. The bulkhead 55 and the filter absorb the heat from the burning of the gas generant 51 to prevent sympathetic ignition.

As seen in FIG. 2, the first combustion chamber 57 has a smaller volume than the second combustion chamber 58; however the volume from the first combustion chamber 57 may be equal or greater than the volume of the second combustion chamber 58. The first filter 45 is disposed adjacent to the bulkhead 55 whereby the exit ports 12 for the first combustion chamber 57 are aligned with the first filter 45. In other words, the first filter 45 is arranged within the first combustion chamber 57 so that the entire opening for each exit port is within the geometric planes formed by the first and second end surfaces 46, 47 of the first filter 45. This arrangement of the first filter 45 helps to ensure that inflation gas passes through the filter before exiting the inflator 10 via the exit ports 12. The second row of exit ports 13 is aligned with the second filter 48.

As discussed above, the inflator 10 has a first and second row of exit ports 12,13. The first row of exit ports 12 provide a passageway for the inflation gas to travel out of the first combustion chamber 57 and the second row of exit ports 13 provide a passageway for the inflation gas to flow out of the second chamber 58. Even though the FIGS show only one row of exit ports for each combustion chamber, there may be more than one row of exit ports for each combustion chamber as long as all the exit ports are aligned with the filters 45, 48. This alignment ensures that the inflation gas must pass through the filter before exiting the inflator 10. A row of exit ports as used herein refers to exit ports arranged around the circumference of the housing 11 whereby all of the exit ports in the row are positioned the same distance from the end of the housing 11. The distance is measured from the center of the exit ports along a path parallel with the longitudinal axis of the housing 11 to the end of the housing 11. The exit ports are preferably covered with a foil 56 such as aluminum or stainless steel foil to prevent the incursion of water vapor. The foil 56, sometimes referred to as "burst foil" is typically of a thickness of from 0.01 to about 0.20 mm. The foil 56 is typically adhered to the interior surface of the housing 11 through the use of an adhesive.

The filters 45, 48 are made from compressed knitted metal wire. The metal wire serves two main purposes. First, the metal wire traps solid particles or slag to prevent these particles from exiting the inflator 10 and entering the airbag cushion. The combustion of gas generants does not yield one hundred percent gas, and thus the filter prevents these solid combustion products from exiting the inflator 10. Second, the filter acts as a heat sink to reduce the temperature of the hot inflation gas. The first filter 45 has a width that is less than half the length for the housing surrounding the first combustion chamber 57. The width of the filter is defined herein as the dimension of the filter between the first and second end surfaces 46, 47 of the filter. Moreover, the width of the second filter is less than half the length of the housing surrounding the second combustion chamber 58. Each filter is disposed in the inflator 10 so that the filter contacts the bulkhead 55 or that there is an insubstantial gap between the filter and the bulkhead 55. Each filter may also contact the interior surface of the housing 11. As used herein the interior surface of the housing 11 includes the interior portion of the cylindrical portion of the housing 11 and does not include any portion of the bulkhead 55. It is desirable for a gap 59 or plenum to exist between the interior surface of the housing 11 and each filter. The gap 59 may be maintained by the use of a position ring or self-centering filter.

A first position ring 40 is situated in the first combustion chamber 57 and the second position ring 41 is situated in the second combustion chamber 58. Each position ring is a circular metal member that is held in position within the inflator 10 by an interference fit with the housing 11. Each position ring has a circular ledge 42 for receiving a portion of filter situated in the same combustion chamber. Alternatively, the gap 59 around each filter may be maintained by incorporating ridges or protrusions in the filters (not shown). The integrally formed ridges would contact the housing 11 while keeping the rest of the filter away from the housing 11. The purpose of the gap 59 is to reduce the probability of the filter clogging the exit ports during the burning of the gas generant 51. The burning of the gas generant 51 produces a significant amount of heat, which potentially could melt a portion of the filter. The gap 59 minimizes the chance of the melted filter from clogging the exit ports and allows for better use of the filter. The gap 59 allows gas to penetrate and pass through the filter in such a way as not localize the exiting of the hot gasses and thereby better utilizing the entire filter.

Figure 3:
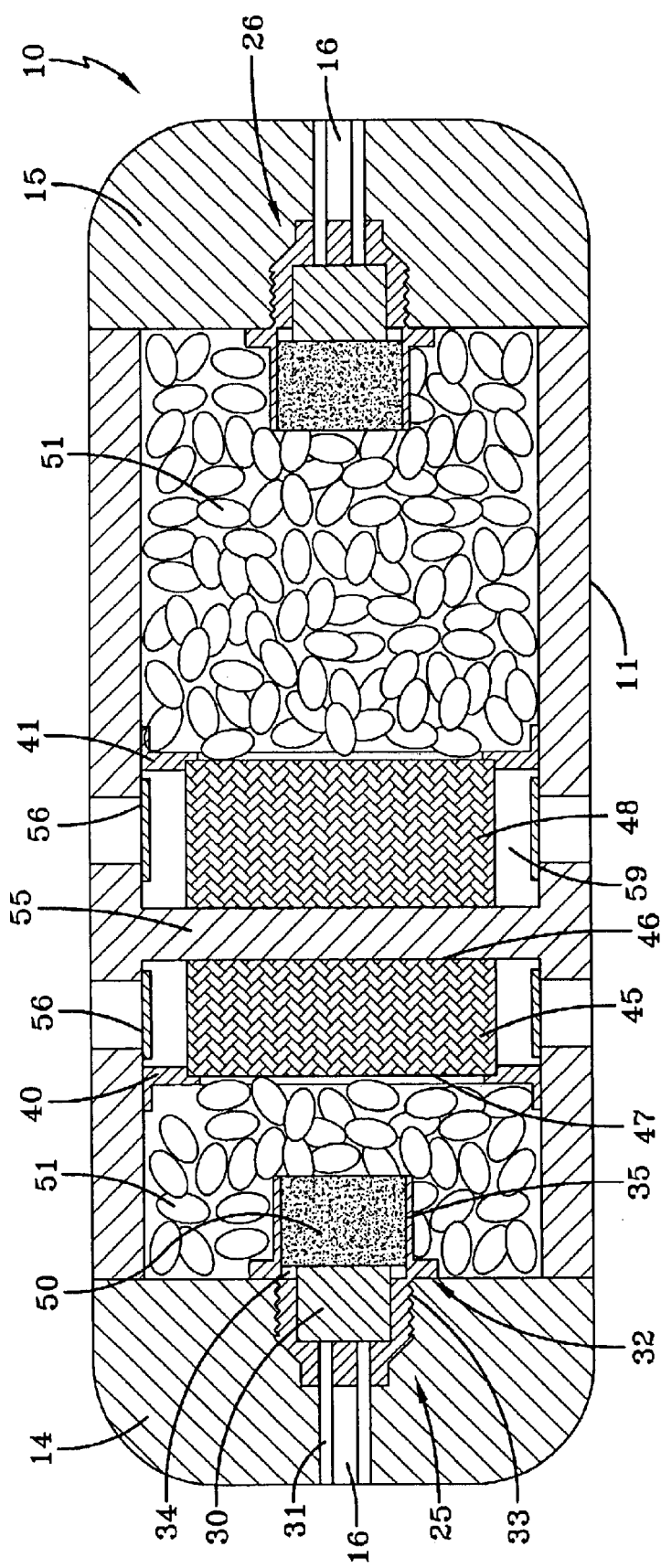
FIG. 3 is a cross section view along the longitudinal axis of the inflator shown in FIG. 1.

Reference is made to FIG. 3, which shows the location of the gas generant 51 inside the inflator 10. The gas generant 51 is a mixture of a fuel and oxidizer that rapidly burn upon ignition. The gas generant 51 is responsible for providing the inflation gas utilized for inflating an airbag. The inflator 10 in accordance with the present invention will function properly with a variety of fuels and oxidizers. Some examples of fuels for the gas generator include high nitrogen content organic compound and the metal salts thereof. Some examples of oxidizers includes metal nitrate, metal oxide, metal chlorate, metal perchlorate, and ammonium nitrate. The gas generant 51 is pressed into tablets and the tablets are randomly placed into the combustion chambers. The gas generant 51 may occupy space in the middle of the filters 45, 48.

The inflator 10 also includes a first and second igniter assemblies for igniting the gas generant 51. Each igniter assembly 25, 26 is secured to the endcaps 14, 15 by threads, which will be elaborated below. Other attachment means are within the scope of the present invention including crimping, welding, and the like. Each igniter assembly 25, 26 has the same physical components, and thus the discussion of the physical components of the igniter assembly applies to both the first igniter assembly 25 and the second igniter assembly 26. The igniter assembly has an igniter core 30, a plastic overmold, and enhancer tablet 50, which can be seen in FIG. 4. The igniter core 30 or squib utilized in the first igniter assembly 25 is an electrically actuated igniter. The electrodes 31 on the igniter core 30 are isolated from one another and connecting to one another via a bridge wire or surface mounted bridge. The bridge wire is preferably embedded in one or more layers of ignition material and is designed to generate sufficient heat and energy to ignite the enhancer tablet 50. Examples of igniter core suppliers include SDI and EMS-Patvag. The preferred embodiment for the igniter core 30 is a bridge wire igniter, but a semiconductor bridge igniter or smart igniter may also be employed.

The igniter core 30 is surrounded by a single plastic overmold 32. The plastic overmold 32 is formed from a single plastic material and is placed around the igniter core 30 by an injection molding process or any suitable process that creates a mold around the igniter core 30. The plastic overmold 32 is preferably made from a high temperature thermoplastic material. The reason the thermoplastic material needs to be a high temperature material is to resist melting during the combustion of the gas generant 51. Accordingly, the thermoplastic material selected for the present invention must not melt below 200° C. Other physical properties of the plastic overmold 32 are the plastic overmold 32 should be shock resistant and good moisture barrier. Some examples of suitable thermoplastic materials include nylon 6, nylon 66, ultem, and the like.

Figure 4:
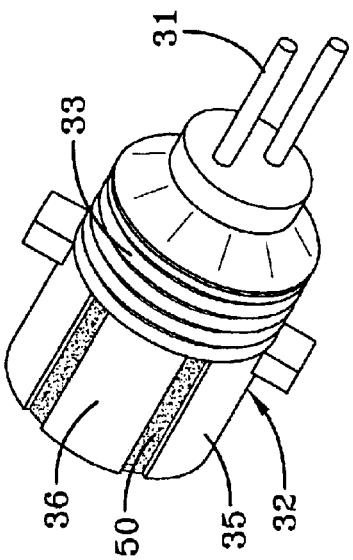
FIG. 4 shows an isometric view of an igniter assembly having an enhancer pellet.

The plastic overmold 32 provides threads 33 for fastening the igniter assembly to the endcap, and also the plastic overmold 32 provides a retainer portion 35 for retaining an enhancer tablet 50. The endcap 14,15 has an opening 16 therethrough for receiving the igniter assembly 25, 26 having the threads 33. The igniter assembly is twisted or screwed into the endcap and this fastening means provides a hermetic seal. With reference to FIG. 3, after the igniter assembly 25, 26 is attached to the endcap 14,15, the electrodes 31 of the igniter core extend to the end of the endcap, but do not extend beyond the end of the endcap. With reference to FIG. 4, the plastic overmold 32 also provides a retainer portion 35 having slots parallel with the longitudinal axis of the igniter assembly creasing a plurality of concave walls 36. The concave walls 36 define a cavity 34 for receiving the enhancer tablet 50. Each of the concave walls 36 flexes outward and this flexing movement allows the enhancer tablet 50 to slide into the cavity 34. After the enhancer tablet 50 is disposed in the cavity 34, the concave walls 36 flex back to the original position thereby securing the enhancer tablet 50 in place. The flexing retainer portion 35 allows the enhancer tablet to be snapped on to the face of the igniter eliminating the need for an enhancer tube or confinement tube.

For the present invention, one or more enhancer tablets may be inserted into the igniter assembly. The enhancer tablet 50 is a gas generating material made from a fuel and an oxidizer that rapidly burns upon ignition. The enhancer tablet 50 may be made from any of the fuels and oxidizers identified above during the discussion of the gas generant 51 for the present invention. The enhancer tablet 50 needs to be easily ignited and burn at hot temperatures in order to quickly ignite the gas generant 51. Even though the enhancer generates inflation gas that contributes to the overall gas output of the inflator 10, the primary purpose of the enhancer is to rapidly ignite the gas generant 51.

The inflator 10 in accordance with the present invention operates by the receipt of an electrical signal by the first and/or second igniter assemblies. The electrical signal triggers the ignition of the ignition train resulting in the filling of the airbag. The electrical signal passes through the bridge wire, which produces heat to ignite the ignition material, which in turn ignites the enhancer, which in turn ignites the gas generant 51. The inflation gas produced from the burning of the gas generant 51 is utilized to inflate the airbag. Due to the existence of two independent combustion chambers in the inflator 10, the inflator 10 can be tuned to release the optimal amount of inflation gas during a crash event. Several contemplated deployment scenarios include the firing of only one igniter assembly, the firing of the igniter assemblies at different times, and the firing of the igniter assemblies simultaneously. Since the design of the inflator 10 does not permit sympathetic ignition, the gas generant 51 in the first combustion chamber 57 will only ignite if the first igniter assembly 25 is fired, and likewise, the gas generant 51 in the second combustion chamber 58 will only ignite if the second igniter assembly 26 is fired.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. An inflator comprising:
   a housing having a bulkhead dividing the housing into a first combustion chamber and a second combustion chamber, wherein the housing has a first plurality of exit ports arranged around a circumference of the housing for providing a first pathway for inflation gas to exit the inflator from the first combustion chamber and a second plurality of exit ports arranged around the circumference of the housing for providing a second pathway for inflation gas to exit the inflator from the second combustion chamber;

a first endcap having an opening for receiving a first igniter assembly, wherein the first endcap is fastened to a first end of the housing, and a second endcap having a center opening for receiving a second igniter assembly, wherein the second endcap is fastened to a second end of the housing;

a first filter having essentially a circular shape disposed in the first combustion chamber adjacent to the bulkhead such that the first filter is interposed between said first plurality of exit ports and a gas generant disposed in the first combustion chamber, the first filter having a width that is less than half of a length of the housing for the first combustion chamber;

a second filter having essentially a circular shape disposed in the first combustion chamber adjacent to the bulkhead such that the second filter is interposed between said second plurality of exit ports and a gas generant disposed in the first combustion chamber, the second filter having a width that is less than half of a lenath of the housing for the second combustion chamber; and wherein each igniter assembly comprises an igniter core having electrodes for carrying an electrical signal to a bridge wire, wherein the passage of current along the bridge wire creates sufficient heat to ignite an ignition material, a plastic overmold partially surrounding the igniter core having threads for attachment to the inflator in a manner to prevent moisture incursion, wherein the plastic overmold has a retainer portion defining a cavity for receiving an enhancer tablet, and the enhancer tablet adiacent to the ignition material and to the gas generant, wherein ignition of the ignition material lights the enhancer tablet, which in turn lights the gas generant.

2. The inflator according to claim 1 wherein the exit ports for the first combustion chamber are arranged in a row situated equal distance from an end of the housing, and the exit ports for the second combustion chamber are arranged in a row situated equal distance from an end of the housing.

3. The inflator according to claim 1 wherein the first filter has a diameter smaller than the diameter of an interior surface of the first combustion chamber whereby a ring shaped gap exists between the housing and the first filter, the second filter has a diameter smaller than the diameter of an interior surface of the second combustion chamber whereby a ring shaped gap exists between the housing and the second filter.

4. The inflator according to claim 3 further comprising a first position ring and a second position ring, the first position ring disposed on a side of the first filter facing the first endcap, the second position ring disposed on a side of the second filter facing the second endcap, wherein the first position ring prevents inflation gas from exiting the first combustion chamber of the inflator without flowing through the first filter, wherein the second position ring prevents inflation gas from exiting the second combustion chamber of the inflator without flowing through the second filter.

5. The inflator according to claim 1 wherein the retainer portion of each igniter assembly has vertical slots forming a plurality of concave flexible walls, the concave walls flex for facilitating the loading and securing of the enhancer tablet in the igniter assembly.

6. An inflator comprising:

a gas generant for producing inflation gas to inflate an airbag; and an igniter assembly comprising;

an igniter core having electrodes for carrying an electrical signal to a bridge wire, wherein the passage of current along the bridge wire creates sufficient heat to ignite an ignition material, a plastic overmold for partially surrounding the igniter core having threads for attachment to the inflator in a manner to prevent moisture incursion, wherein the plastic overmold has a retainer portion defining a cavity for receiving an enhancer tablet, and the enhancer tablet adjacent to the ignition material and to the gas generant, wherein ignition of the ignition material lights the enhancer tablet, which in turn lights the gas generant.

7. The inflator according to claim 6, wherein the retainer portion has vertical slots creating a plurality of concave walls, wherein the concave walls flex for facilitating the loading and securing of the enhancer tablet in the igniter assembly.

8. The inflator according to claim 6, wherein the plastic overmold is made from a single thermoplastic material.

9. The inflator according to claim 6, wherein the plastic overmold covers only a portion of the electrodes.

* * * * *